Patented May 30, 1944

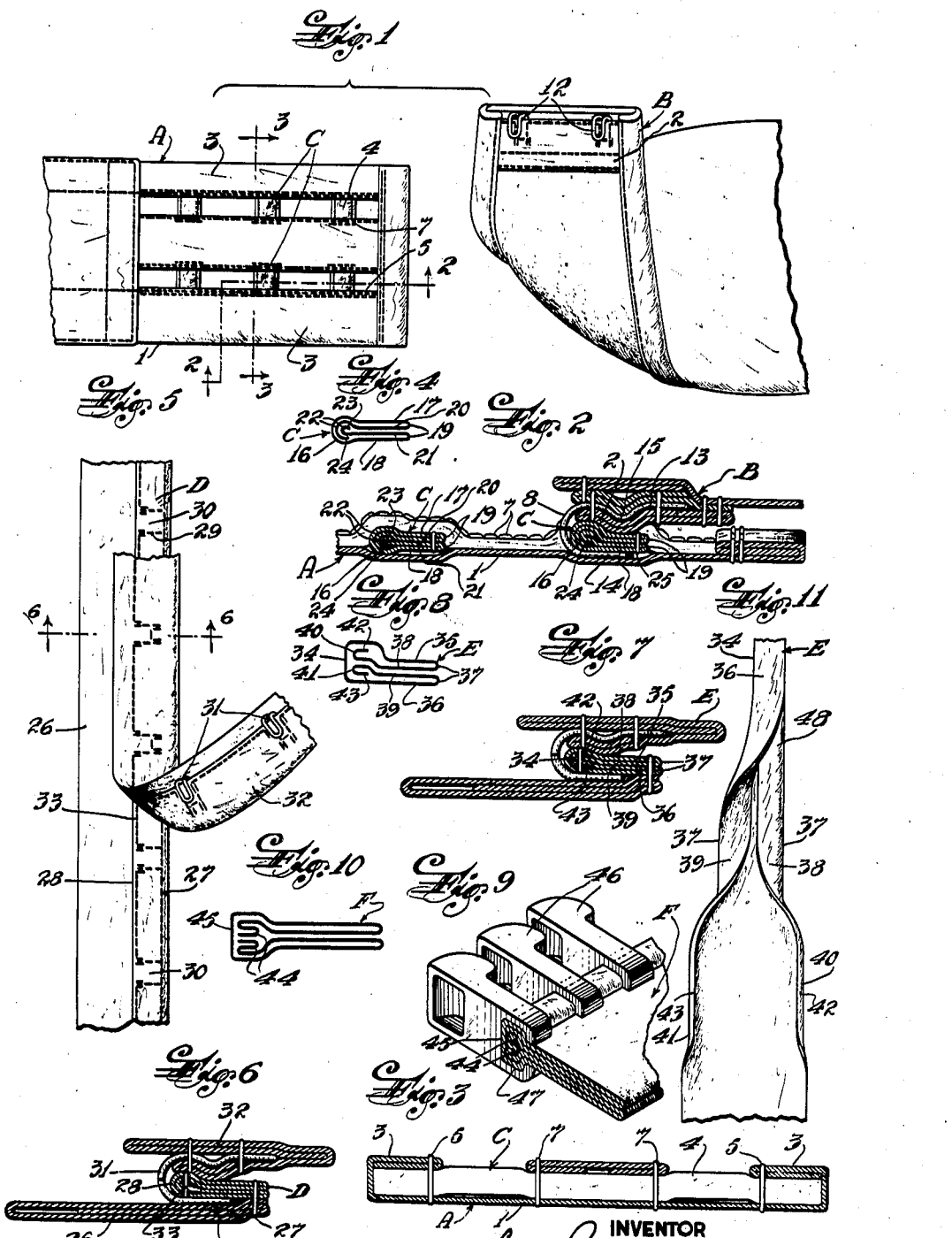

2,350,194

UNITED STATES PATENT OFFICE 2,350,194

FABRIC FASTENER ELEMENT

Leo Roseman, Newark, N. J.

Application January 14, 1943, Serial No. 472,393

6 Claims. (Cl. 24—203)

This invention relates in general to fasteners of the type wherein a narrow strip of fabric, leather or the like is secured at spaced points to one of two parts to be connected with portions of at least one edge of the strip between said points free from said point to permit engagement with the strip of a hook attached to the other of said parts.

Fasteners of this general character are described in my United States Patent No. 1,677,903 dated July 24, 1928, and in my copending application Serial No. 463,450, filed October 27, 1942, and as pointed out in said patent and said application such fasteners may be used for various purposes, for example to connect the edges of openings in garments such as brassières, girdles, aprons, etc., or for connecting any two parts of a garment or article.

Due to the softness and yieldabiltiy of fabric, leather and similar materials, it is difficult to obtain and maintain a firm engagement of the hook with a fastener strip like those above described so as to prevent accidental or unintentional "backing off" or disconnection of the hook from the strip, even when the hook, as usual, has a so-called "hump" to frictionally interlock with the strip. Also the edge of the strip over which the hook is slid during connection and disconnection of the hook to and from the strip, is relatively flexible and soft so that some difficulty may be encountered in connecting the hook to the strip.

This is especially true where there is a row of hooks on one of the two parts to be connected because frequently during the operation of connecting one hook to the strip, the adjacent hook that previously has been connected to the strip is unintentionally pulled away or disconnected from the strip.

Therefore one object of my invention is to provide a fastener element of the character described, i. e., a strip of fabric or the like which shall embody novel and improved features of construction, including a thickened edge or lip to cooperate with the hump on a hook so as to ensure firm and secure engagement of the hook with the strip when the latter is applied to a part to be connected to another part and thereby prevent or reduce the possibility of unintentional disconnection of the hook from the strip.

Another object is to provide such a fastener element or strip which shall have one edge reenforced or stiffened in a novel and improved manner to facilitate connection of a hook to said strip.

A further object is to provide a fastener strip which shall embody a novel and improved construction such that one edge portion of the strip shall have a longitudinal bead or shall be of greater thickness than the other portions of the strip to accomplish the objects above described and also to facilitate the attachment of articles, for example fastener elements of "zipper" fasteners, to the strip.

My invention contemplates a fastener strip formed of a plurality of plies, layers, or thicknesses of material, particularly textile fabric, and another object is to form and arrange such plies or thicknesses so that at least one longitudinal margin of the strip shall have only one fold or edge of the material exposed, i. e. so that a plurality of plies or thicknesses or folds shall be covered by or enclosed within a smooth, uninterrupted main fold or layer of material, whereby these shall be no possibility of a hook bill becoming "snagged" or caught on the edge of the strip.

Other objects, advantages and results of the invention will be brought out by the following description in conjunction with the accompanying drawing in which Figure 1 is a composite view on an enlarged scale showing one section of the fastener in plan and the other section in perspective.

Figure 2 is an enlarged vertical longitudinal sectional view on the line 2—2 of Figure 1.

Figure 3 is a transverse vertical sectional view on the line 3—3 of Figure 1.

Figure 4 is a schematic sectional view of the cross strip.

Figure 5 is a top plan view of a modified form of the fastener.

Figure 6 is an enlarged transverse vertical sectional view on the line 6—6 of Figure 5.

Figure 7 is a view similar to Figure 6, showing a modified form of the fastener element or strip.

Figure 8 is a view similar to Figure 4 showing the strip illustrated in Figure 7.

Figure 9 is a sectional perspective view of another form of the fastener strip.

Figure 10 is a view similar to Figure 8 of the strip illustrated in Figure 9, and Figure 11 is a fragmentary top plan view of a piece of material showing the manner of folding it to make the fastener strip embodying the invention.

In general, my fastener comprises two sections A and B one of which includes one or more rows of fastener elements C with which selectively cooperates the other section B of the fastener which includes a hook 12 for each row of fastener elements. While the invention contemplates the application of the fastener element C and the hooks 12 directly to two parts to be connected, for example two parts of a garment or article, the invention more particularly is directed to a fastener wherein the fastener elements are connected to a tape or strip 1, which is applied to a portion of a garment or an article such as one end of a brassière, and the hooks 12 are attached to a tab or strip 2 which is connected to the other portion of the garment or article, such as the other end of the brassière.

Each fastener element C comprises a cross strip of suitable material such as textile fabric that is disposed transversely of the base strip and secured thereto at points spaced longitudinally of the cross strip with portions of the cross strip between said points spaced from the base strip to receive the bill of a hook and permit engagement of such hook with the cross strip.

Suitable means is provided for securing the cross strips C to the base strip and as shown lines of stitches 5 extend longitudinally of the base strip, each penetrating one inwardly folded edge portion 3, the main portion of the base strip and the cross strips 4, and other lines of stitches 7 penetrate the base and the cross strips at points spaced from the stitches 5.

Now, referring to the section B of the fastener, there is one hook 8 for each row of fastener elements C, each hook including a base or shank 13 secured to the strip 2 in any suitable manner, and a bill 14 which projects from the strip so that it may be inserted beneath one of the cross strips C for connection thereto as shown in Figure 2. Preferably the cross strip C is of a width equal to or greater than the length of the hook bill 14 so that the hook will be prevented from swinging in planes perpendicular to the plane of the base strip. The bill or the shank, preferably the latter, has a hump or projection 15 to ensure snug frictional contact of the hook with the cross strip to reduce the possibility of accidental slipping or disconnection of the hook from the cross strip.

In accordance with the invention, each cross strip C comprises a piece of textile fabric or other suitable flexible material having a main longitudinal fold forming one edge portion of the strip and two main superposed plies, and one or more thicknesses or layers of material, which as shown are a plurality of other superposed plies of the same piece of fabric, disposed between said main plies within, at or running along said main longitudinal fold so that said edge portion constitutes a reenforced lip for the strip which is thicker than the remainder of the strip and will cooperate with the projection or hump 15 of the hook 8 to restrain disconnection of the hook from the cross strip.

Referring particularly to Figures 2, 3 and 4, the cross strip is formed of a piece of material approximately rectangular in plan which has its longitudinal marginal portions folded inwardly to form the main longitudinal fold 16 and two main plies 17 and 18 connected by an integral portion of said piece at said fold. These marginal portions are also longitudinally folded at 19 to form other superposed plies 20 and 21 between said main plies, and the edge portions of said piece are folded at 22 to form additional superposed plies 23 and 24 which are narrower than the other plies and are disposed inside or within and run along the main fold 16 close to said integral portion of said piece that connects said plies and in spaced relation to the other edge portion of said strip opposite said main fold. Thus there are more superposed plies along the main fold 16 than elsewhere in the strip and the longitudinal edge portion of the strip adjacent said fold is thicker than the remainder of the strip.

The several plies may be fastened together in any suitable way, but preferably by a line of stitches 25 that runs longitudinally of the strip and penetrates the plies.

The lip or thick edge portion of the strip formed by the plies 23 and 24 is of a width less than the distance from the hump 15 of the hook to the curved neck between the shank and the bill of the hook. Thus when the strip 4 is secured to the base A and the hook is slipped over the thick edge portion or lip of the strip to bring the latter between the bill and the shanks of the hook, as shown in Figure 3, it will be observed that the hump 15 will engage behind the thick edge portion or lip so that unintentional or accidental disconnection of the hook from the strip will be prevented or restrained. Also the secondary folds 22 and the edges of the plies are covered by the smooth uninterrupted layer of fabric on the main fold 16, so that there is no possibility of the hook bill becoming caught on the thick edge or lip of the strip.

Also the multiple plies along the main fold 16 of the strip stiffen or reenforce the edge portion of the strip so that the latter will not flex or be deformed as the hook is slipped over said edge portion of the strip. Thereby connection of the hook to the strip is facilitated.

In Figures 5 and 6 of the drawing I have shown a modification of the invention wherein the fastener strip D, which may be of the same construction as the strip C, runs longitudinally of a base 26, and a line of stitches 27 extends longitudinally of the strip D and base 26 adjacent the edge of the strip that is opposite the thick edge or lip and main fold 28 which corresponds to the fold 16 of Figures 2 and 4, for securing the strip to the base. At spaced points longitudinally of the strip other lines of stitches 29 pass through the strip and the base to form pockets 30 each to receive the bill of the hook 31 which is attached to another part, for example a strip of fabric 32. Preferably other lines of stitches 33 extend longitudinally of the base and strip between the pockets for further securing the strip to the base.

This form of the invention is especially useful in connecting the edges of along openings in garments, for example the edges of a corset opening, the base 26 being attached to one edge of the garment and the part 32 being attached to the other edge.

The manner of cooperation of the hooks 31 with the portions of the strip D at the pockets 30 is the same as the cooperation of the hook 12 with the strip C.

Another form of fastener strip E is shown in Figures 7 and 8 wherein the piece of material has its longitudinal marginal portions folded inwardly to form the main longitudinal fold 34 and two main plies 35 and 36 which are again folded at 37 to form other plies 38 and 39 the edge portions of which are folded in opposite directions at 40 and 41 to form the additional plies 42 and 43. These plies 42 and 43 are narrower than the other plies and run along or within the main fold 34 so as to make the edge portion of the strip along the main fold thicker than the remainder of the strip.

Figures 9 and 10 show another modification F of the strip which is the same as that shown in Figure 8, except that the edge portions of the piece of material are repeatedly folded inwardly toward each other as at 44 to provide the additional layers required for thickening the edge portion of the strip along the main fold 45 which corresponds to the main folds 16 and 34. While this form of strip may be used for the same purposes as the strips C and D it is especially useful for attaching the fastener elements 46 of a "zipper" fastener to an article or garment. The bifurcated root ends 47 of the fastener elements may be clamped around the thickened edge portions of the strip which will provide a firm attachment of the fasteners to the strip.

The various forms of the fastener strips may be made in any suitable manner, but conveniently each strip may be folded in a continuous operation such as generally illustrated in Figure 11 which specifically depicts the formation of the strip E shown in Figures 7 and 8. The piece of material 48 is first folded along two parallel lines adjacent its longitutinal margins to form the folds 40 and 41. Then the piece is folded longitudinally to produce the folds 37, after which the piece is folded along its longitudinal median line to produce the main fold 34.

It will be understood by those skilled in the art that the structure of the fastener and the fastener strip embodying my invention may be widely modified and changed within the spirit and scope of the invention.

Having thus described my invention, what I claim is:

1. As an article of manufacture, a strip of flexible material for use as a fastener element, comprising a piece of flexible material having two main superposed plies connected by an integral portion at a main fold that extends longitudinally of said piece and forms one edge portion of said strip, and a plurality of superposed layers of material disposed between said main plies close to said integral portion at said main fold in spaced relation to the other edge of said strip and extending longitudinally of said main fold so that said edge portion at said main fold is thicker than the remainder of said strip.

2. As an article of manufacture, a strip of flexible material for use as a fastener element, comprising a piece of flexible material having its longitudinal marginal portions folded inwardly and forming two main superposed plies connected by an integral portion at a fold which forms one edge portion of said strip, said marginal portions also being longitudinally folded and forming other superposed plies between said main plies, and the edge portions of said piece being again longitudinally folded to form additional superposed plies inside and extending longitudinally of said main fold close to said integral portion and in spaced relation to the other edge of said strip so that said edge portion of said strip along said main fold is thicker than the remainder of said strip.

3. As an article of manufacture, a strip of flexible material for use as a fastener element, comprising a single piece of flexible material having its longitudinal marginal portions folded inwardly and forming two main superposed plies connected by an integral portion at a fold which forms one edge portion of said strip, said marginal portions also having a plurality of longitudinal folds forming a plurality of superposed plies between said main plies, said plies being arranged so that a larger number are disposed inside said main longitudinal fold than elsewhere and close to said integral portion and spaced from the other edge of said strip to make said longitudinal edge portion of said strip along said main fold thicker than the remainder of said strip.

4. The article of manufacture set forth in claim 1 with the addition of a line of stitches running longitudinally of said strip and passing through at least said main plies.

5. In combination with a hook, a fastener part including a base and a fastener element which comprises a strip of material secured at spaced points in its length to said base so that an edge portion of said strip is free from said base to permit engagement of said hook with said strip, said strip including a piece of flexible material having two main superposed plies connected by an integral portion at a main fold that extends longitudinally of said piece and forms said edge portion of said strip, and a plurality of superposed layers of material disposed between said main plies close to said integral portion at said main fold in spaced relation to the other edge of said strip and extending longitudinally of said main fold so that said edge portion at said main fold is thicker than the remainder of said strip to ensure secure frictional contact of said hook with said strip.

6. In a fastener wherein a hook has a shank and a bill to receive a strip of material between them, one of which has a hump, the combination with said hook of a fastener part that comprises a piece of flexible material having two main superposed plies connected by an integral portion at a main fold that extends longitudinally of said piece and forms one edge portion of said strip, and a plurality of superposed layers of material disposed between said main plies close to said integral portion at said main fold in spaced relation to the other edge of said strip and extending longitudinally of said main fold so that said edge portion at said main fold is thicker than the remainder of said strip and said hump on said hook will engage behind said thick edge portion of said strip when the hook is connected to the strip and thereby restrain disconnection of said hook from said strip.

LEO ROSEMAN.